United States Patent [19]

Cashmore et al.

[11] Patent Number: 5,140,204
[45] Date of Patent: Aug. 18, 1992

[54] HEAT PIPES FOR COOLING POLE WINDINGS OF SALIENT POLE MACHINES

[75] Inventors: Douglas H. Cashmore, Tulsa, Okla.; Robert J. Budenholzer, Monroeville; Luciano Veronesi, O'Hara Township, Allegheny County, both of Pa.

[73] Assignee: Westinghouse Electric Corp., Pittsburgh, Pa.

[21] Appl. No.: 726,102

[22] Filed: Jul. 5, 1991

[51] Int. Cl.$^5$ .................. H02K 1/32; H02K 3/24; H02K 3/487
[52] U.S. Cl. .................................. 310/61; 310/64; 310/214
[58] Field of Search ............ 310/52, 55, 54, 60 A, 310/61, 64, 214, 269

[56] References Cited

U.S. PATENT DOCUMENTS

| | | | |
|---|---|---|---|
| 2,899,573 | 8/1959 | Wesolowski | 310/60 |
| 3,008,786 | 11/1961 | Costello | 310/214 |
| 3,480,810 | 11/1969 | Potter | 310/54 |
| 3,715,610 | 2/1973 | Brinkman | 310/54 |
| 3,801,843 | 4/1974 | Corman et al. | 310/52 |
| 4,322,646 | 3/1982 | Persson | 310/64 |
| 4,409,502 | 10/1983 | McCabria | 310/61 |
| 4,943,746 | 7/1990 | Scherzinger et al. | 310/61 |

FOREIGN PATENT DOCUMENTS

| | | | |
|---|---|---|---|
| 0621075 | 11/1935 | Fed. Rep. of Germany | 310/54 |
| 0142112 | 6/1980 | Fed. Rep. of Germany | 310/214 |
| 40581 | 11/1915 | Sweden . | |
| 0434539 | 11/1974 | U.S.S.R. | 310/54 |
| 588595 | 1/1978 | U.S.S.R. . | |
| 0609177 | 5/1978 | U.S.S.R. | 310/61 |
| 1381109 | 1/1975 | United Kingdom | 310/61 |

*Primary Examiner*—Steven L. Stephan
*Assistant Examiner*—C. LaBalle

[57] ABSTRACT

Heat pipes having predetermined configurations and positioned within the wedges and wedge retainers for maintaining the rotor field windings in position for efficiently collecting heat generated along the length of the rotor field windings and rotor surface and transporting this heat to the ends of the rotor where it is transferred to a coolant medium such as a gas or spray liquid are disclosed. The particular heat pipe positioning and configuration provides an optimal amount of heat transfer surface area for transferring heat from the wedge material to a volatile fluid within the heat pipe. Heat is thus efficiently transferred to the volatile fluid which changes the volatile fluid from a liquid phase to a vapor phase where the vapor flows at a high speed to a condenser section beyond the axial length of the rotor field windings where heat is dissipated from the volatile fluid to the cooling medium.

31 Claims, 3 Drawing Sheets

HEAT PIPES FOR COOLING POLE WINDINGS OF SALIENT POLE MACHINES

FIELD OF THE INVENTION

The present invention relates generally to the cooling of salient pole machines and more particularly to the cooling of the rotor field windings in salient pole machines.

BACKGROUND OF THE INVENTION

A major limitation to the design of compact, high-power density synchronous electric motors and generators is the ability to remove heat from the rotor field windings and rotor surface to maintain suitably low component temperatures. Improvements in the efficiency of cooling rotating electrical machinery result in increased capacity or power output for a given machine. With machines which are cooled by the circulation of air or other gases, the coolant is generally forced through various passages in the machine by a fan. Attempts to improve cooling efficiency by maximizing the exposure of machine components to coolant and minimizing obstructions to the flow of the coolant have resulted in machine designs which include coolant passages throughout the rotors and stators of synchronous electric machines.

The rotors of synchronous electric machines, either motors or generators, experience ohmic heating within the field windings due to the flow of dc excitation current, and on the outer surface of the rotor by the flow of eddy currents induced by armature currents and relative motion. The useful operating capability of such machines is limited by the ability of rotor cooling systems to remove this heat while maintaining component temperatures at levels acceptable for insulation life and mechanical stability of the rotor. In general, advances in machine rating per unit of volume or weight have been achieved by increase of the effectiveness of rotor and stator cooling.

During normal operation of synchronous machines, heat is generated in the various pole pieces mounted on the peripheral surface of the rotor; and if this heat is not transferred away from these pole pieces, serious reduction in the efficiency and power output of the machine results as discussed herein above. Many different arrangements have been resorted to in the past in an attempt to maintain the pole pieces at as low a temperature as possible in order to achieve an optimum efficiency of the device.

Machines which utilize salient pole rotors have been provided with wedges in the interpole spaces to conduct coolant through these spaces. Such a device is disclosed in U.S. Pat. No. 2,899,573 issued to Wesolowski. This device discloses a salient pole rotor cooling wedge for maintaining the position of the rotor field windings which permits the flow of air into and through the wedges. In doing so, the continuous flow of air through the wedge is used to transfer heat from the rotor field windings to the atmosphere.

Similar to the foregoing, U.S. Pat. No. 4,409,502 issued to McCabria and assigned to the assignee of the subject application discloses a self-cooled rotating electrical machine which is provided with multiple axial and radial coolant passages. A-shaped wedges are positioned in each interpole space with the wedges including a vane and impeller on each end to force cooling air through the machine. Air entering through the ports in the frame assembly passes through an exciter generator which is located at the drive end of the frame assembly. Air entering through other ports in the frame assembly pass through a rotating rectifier assembly located within the rotor. After passing through the excited generator and the rotating rectifier assembly, the air enters the main cooling circuit of the machine. Each of the A-shaped wedges include an axial rotor coolant passage which runs the length of the rotor. As the rotor turns vanes on the ends of the wedges impart an outward flow due to centrifugal force action upon the air. Part of the air enters the slots in the wedges at the anti-drive end of the rotor. A portion of that air is expelled at the center of the rotor through holes in the center of the wedges while the remainder is expelled at the drive end of the rotor. By utilizing the hollow A-shaped wedges, air is allowed to pass through the wedges and transfer heat from the rotor field windings to the surroundings, thus cooling the windings. However, by using air flow to cool the space within the wedges, the rotor will experience drag which may be detrimental to the efficiency of the electrical machine.

An alternative to the aforementioned use of air flow to cool the rotor field windings of synchronous electric motors and generators, is the use of a rotating heat pipe as disclosed in U.S. Pat. No. 3,715,610 issued to Brinkman. Therein, heat which is generated within a rotor is removed utilizing a heat pipe rotating about the rotor shaft. Heat is absorbed from the rotor by vaporization with a portion of the refrigerant within a rectangular evaporator juxtaposed with the heat generating region. The evaporator is positioned within the rotor coils; e.g., at the center of the field pole winding of a synchronous machine in order to conduct heat away from the field pole windings. The configuration of this heat pipe involves an external condenser constructed of finned tubing. Support of such a configuration in a high speed rotor is impractical. Also, with such a cooling device, any maintenance of the heat pipe would, in most cases, require the entire disassembly of the rotor including that of the windings in order to gain access to the heat pipe. This configuration of heat pipe also utilizes space which would be otherwise available for field winding copper. With respect to the subject invention, the wedge shaped heat pipes occupy space which is not conveniently used for the field windings. These areas can only be filled with windings having expensive tapered geometries. Any reduction in field winding space increases the total heat generated in the field winding and, therefore, the heat load on the heat pipe itself. Additionally, due to the configuration of the heat pipe, only a limited surface area is utilized for the transfer of heat from the field pole windings to the coolant; and, consequently, such a heat pipe only realizes a limited cooling of the field pole windings.

Clearly, there is a need for a means for reliably cooling the rotor field windings of synchronous electric motors which may be readily maintained without the destruction of the rotor field windings and which provides an extended heat transfer surface for transferring heat from the rotor field windings to a heat transfer medium in an efficient manner.

SUMMARY OF THE INVENTION

A primary object of the present invention is to provide a heat transfer device which overcomes the aforementioned shortcomings of the prior art.

A further object of the present invention is to provide a heat transfer device for collecting heat generated in the rotor field windings and rotor surface of synchronous machines and transporting such heat to the ends of the rotor where it is transferred to a cooling medium.

It is yet another object of the present invention to provide a heat pipe configuration which minimizes the temperature gradients along the length of the heat pipe while maintaining rigid design characteristics capable of being used in high-speed rotors.

Another object of the present invention is to provide at least one heat pipe within a wedge positioned in the inner pole spaces of a salient pole device with the wedge being formed from non-magnetic highly conductive material, such as aluminum, berillyium or copper, which serves a dual purpose of restraining coil motion perpendicular to the pole center line and collecting heat generated along the length of the coil by conduction through appropriate insulation layers. This dual purpose is synergistic, in effect, in that the force of the coil against the heat pipe wedge promotes good thermal contact therebetween.

Another object of the present invention is to provide one or more wedges in the interpole spaces having one or more heat pipes formed therein in order to effectively transfer heat collected within the heat pipe to a point along the length of the heat pipe which extends axially along the axial extent of the rotor field windings. The particular number of heat pipes being dependent upon the particular application of the salient pole machine.

Yet another object of the present invention is to eliminate the necessity of large and fragile condenser constructions by providing a rugged, heat pipe configuration wherein the condenser section is an integral part thereof.

Yet another object of the present invention is to provide a condensing region at the portions of the heat pipe which extend beyond the axial extent of the rotor field windings. Such configuration may comprise an array of fins so as to promote the flow of the cooling medium and to increase the surface area which is contacted by the cooling medium.

The heat pipe contains a volatile fluid which experiences a liquid to vapor phase transition at temperatures and pressures consistent with a particular machine requirement. The shape of the heat pipe internals is uniquely adapted for application to rotary machines. The outermost wall of the heat pipe channel substantially exemplifies an axial element of a cylinder. The liquid phase of the working fluid is forced under an action of centrifugal force against this outer wall while the remaining heat pipe space is occupied by essentially saturated vapor in equilibrium with the liquid phase. Heat transport is accomplished within the heat pipe by a closed evaporation and condensation cycle. The heat conducted through the walls of the evaporator section in contact with the field windings is transferred to the liquid phase of the working fluid. The heat addition causes boiling and generation of a vapor which flows at a high speed toward the condenser section of the heat pipe which extends beyond the axial extent of the rotor field windings. This vapor is then cooled by the external cooling medium wherein the vapor condenses, releasing the heat of vaporization to the external cooling medium. This now condensed liquid phase working fluid returns towards the midsection of the heat pipe to replace that which is now being evaporated from the evaporator section, thus, maintaining a constant liquid fraction and gas pressure at any steady state operating condition.

Yet another object of the present invention is to provide a heat pipe having a predetermined cross-sectional configuration which optimizes the available cross-sectional area which optimizes the surface area for the transfer of heat from the rotor field windings to the volatile working fluid. A thin film of liquid is thus in contact with the cylindrical surface of the outer wall and provides a significant boiling surface without detracting from the vapor flow space. In order to increase the capacity of the heat transfer which takes place along the outer surface of the heat pipe, shallow ribs or flutes may be provided in the outer surface which extend in the axial direction of the heat pipe in order to form a greater surface area in contact with the boiling liquid phase.

A further object of the present invention is to provide shielding of liquid advancing into the evaporator section from the oppositely directed flow of vapor returning to the condenser, by means of a screen or perforated plate supported by a fluted evaporator wall, or by way of a porous medium on the evaporator wall with sufficient porosity to allow unobstructed liquid motion and the exit of evolved vapor.

Another object of the present invention is to vigorously extract heat from the condenser end of the heat pipe and transfer such heat to an external heat transfer medium. Depending on the application and temperature, the external heat transfer medium may be air or other gases, sprayed droplets of a nonvolatile liquid, such as oil, or sprayed volatile liquids, such as water, freon or liquid cryogens. The heat transfer medium may be sprayed on the condenser end section of the heat pipes by stationary auxiliary spraying nozzles directed at the condenser end of the heat pipe or the spray can originate from nozzles on the rotor body itself or the rotor shaft.

Another object of the present invention is to provide extended surface for condensation of vapor in the condenser which is oriented radially with respect to the axis of rotor rotation and such that condensed liquid will be centrifuged from such surface and not coat it, thus providing a thermal barrier to further condensation. Such radial extended surface may be provided by ribs or pins projecting radially outward into the vapor spaces, or by circular holes or slots projecting radially inward into thickened fins or hollow spines which are exposed to the external cooling medium. This latter arrangement provides an extended surface both for condensation and for convection of heat to the external cooling medium with a minimum thickness and maximum area of metal restricting conduction of heat between condensing and conducting surfaces.

In yet another object of the present invention, in order to enhance the cooling of the rotor field windings, a wedge retainer which is positioned radially outwardly from the wedges for maintaining the wedges in their position between the rotor field windings may be provided with additional heat pipes for transferring heat away from the rotor field windings through the wedge retainer. In order to optimize the heat transfer capability of the heat pipes within the wedge retainer, these heat pipes may be of an oval or eliptical cross-section having a major axis thereof extending substantially perpendicular to the radial extent of the rotor.

These, as well as additional objects of the present invention, are achieved by an assembly for cooling salient pole machines including a stator circumferentially surrounding a rotor including a plurality of poles having interpole spaces therebetween for accommodating the pole windings, a wedge positioned within each of the interpole spaces for securing the position of the respective windings and at least one closed end coolant conducting heat pipe formed in the wedge for conducting coolant within the wedge such that the coolant conducting heat pipe conducts heat away from the pole windings. The heat pipe being in the form of an elongated bore extending substantially perpendicular to a plane which axially bisects the wedge with the elongated bore being of a trapezoidal cross-section having a major surface and a minor surface extending substantially perpendicular to the plane which longitudinally bisects the wedge with the major surface being spaced radially outward from a minor surface with respect to a central axis of the rotor. A porous material may also be positioned adjacent the major surface in order to aid in the movement of a volatile liquid within the heat pipe by wicking, to augment the boiling heat transfer surface, or to shield the liquid phase from entrainment by the vapor flow. Additionally, a wedge retainer is positioned in the interpole space for retaining the wedge in place. In order to aid in heat transfer from the outer pole surfaces and pole face damper windings, the wedge retainer may be provided with at least one coolant conducting heat pipe extending substantially longitudinally therethrough for conducting coolant through the wedge retainer to transfer heat away from the pole face region to a condenser section which extends beyond the axial extent of the poles. In some applications, the wedge retainer may be integral with the interpolar heat pipe to promote simplicity of design, structural integrity, and the ability to conduct rotor surface heat to the interpolar heat pipe.

These, as well as additional objects of the present invention, will become apparent from the following detailed description of the preferred embodiment with reference to the several figures.

DETAILED DESCRIPTION OF THE INVENTION

Figure 1:
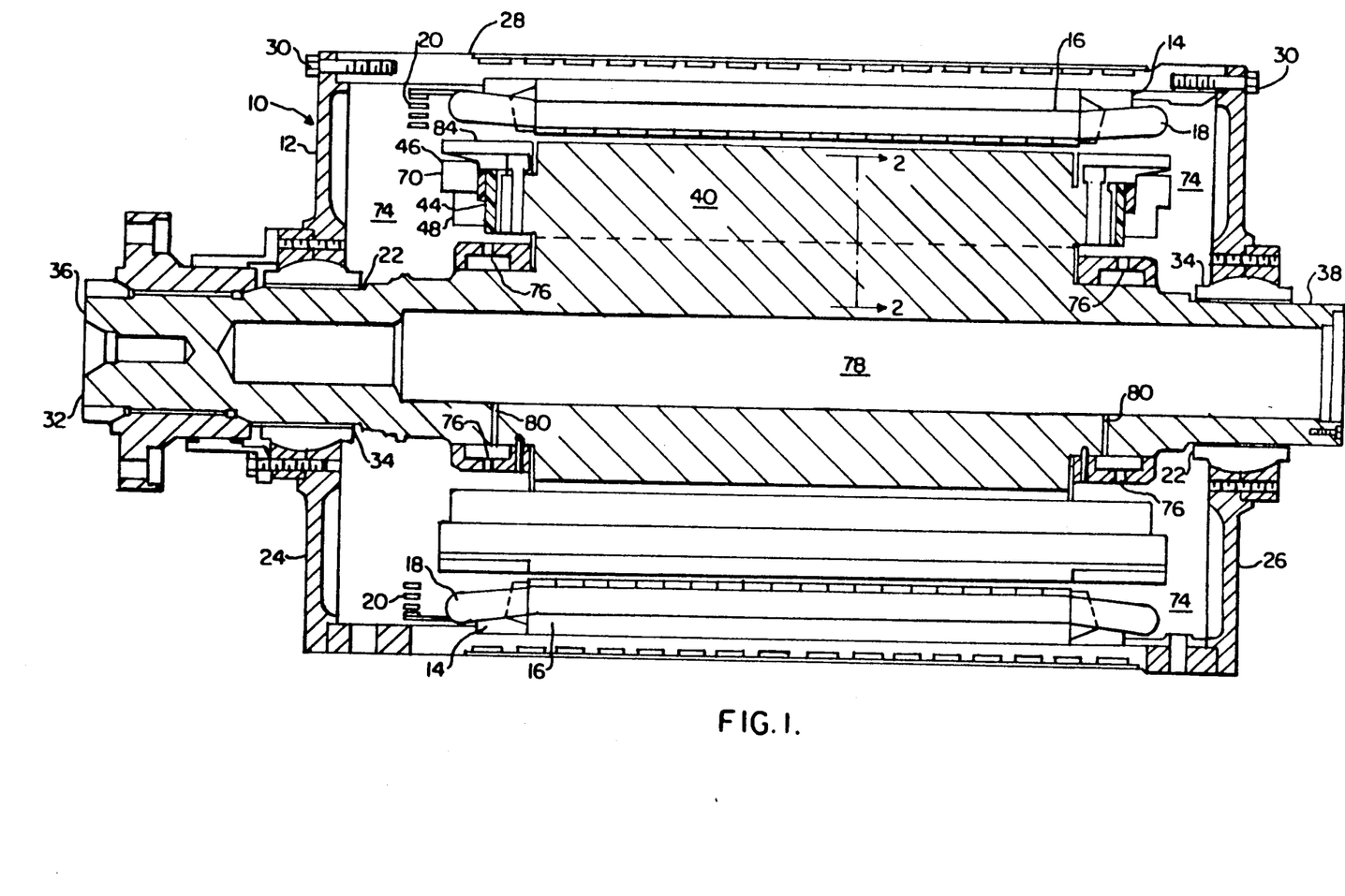
FIG. 1 is a cross-sectional illustration of a synchronous electric machine including axially extending wedges having heat pipes formed therein in accordance with the present invention.

FIG. 1 illustrates a synchronous electric machine 10 to which the present invention may be readily adapted. The synchronous electric machine may be either a motor or a generator and includes a housing 12 for accommodating the various elements which make up the synchronous electric machine. Fixedly secured to the housing 12 is the stator 14 which includes a stator core 16 and stator windings 18. Connection rings 20 are also provided adjacent the stator windings 18 in a conventional manner.

The housing 12 is provided with a central bore 22 in each of end plates 24 and 26, respectively, with the end plates being fixedly secured to the cylindrical portion 28 of the housing 12 by way of fastening elements 30. Rotatably positioned within the bore 22 of the housing 12 is a rotor shaft 32 which axially extends through the housing and is rotatably supported within the bore 22 by way of bearing elements 34. Respective ends 36 and 38 of the rotor shaft 32 extend beyond the end plates 24 and 26 of the housing 12.

As illustrated in FIG. 1, the rotor shaft end 36 includes a coupling mechanism for coupling the synchronous electric machine to various other elements of the assembly while the end 38 may be adapted to receive coolant fluid, as will be described in greater detail hereinbelow.

Figure 2A:
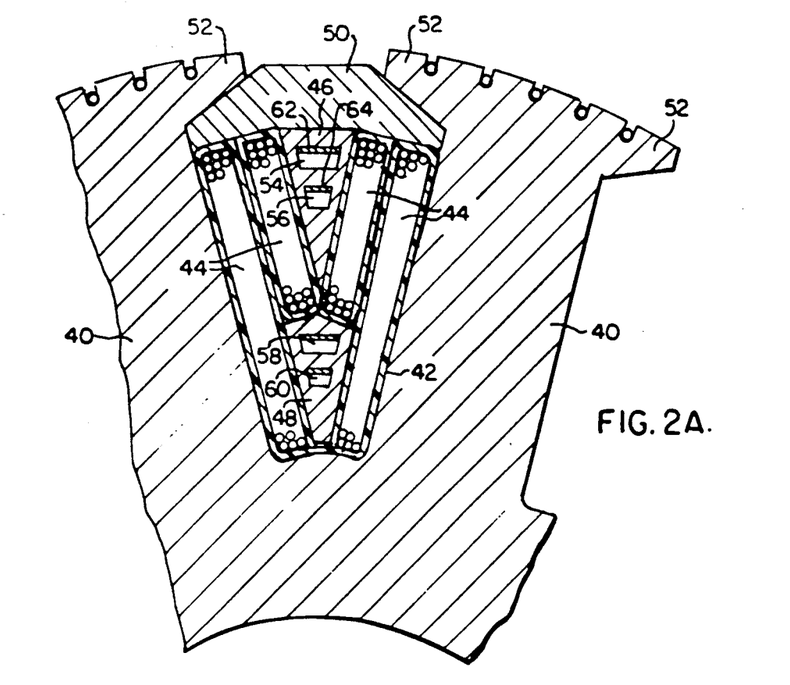
FIG. 2A is a cross-sectional view taken along line 2—2 of the rotor of the synchronous electric machine of FIG. 1 including wedges employing the heat pipe configuration in accordance with the present invention.
Figure 2B:
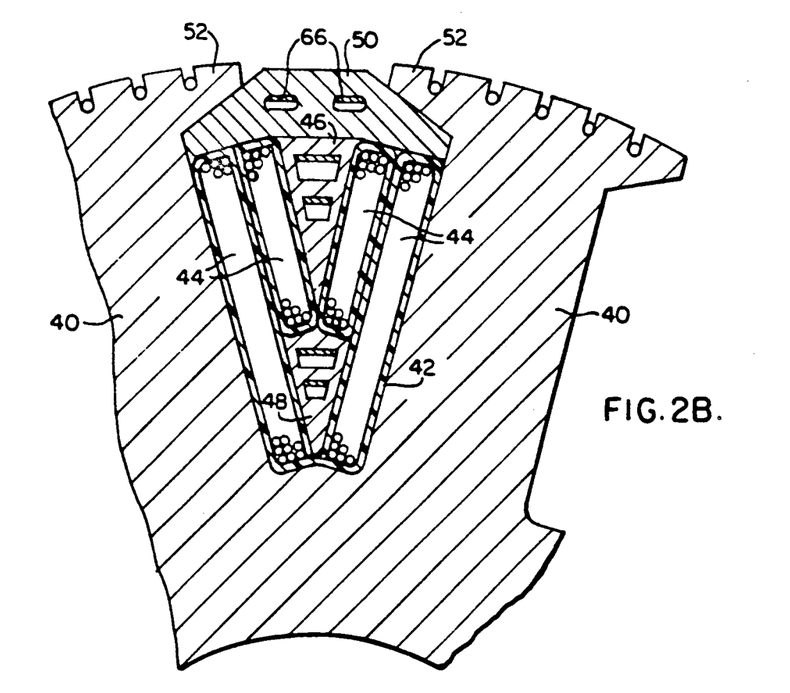
FIG. 2B is a cross-sectional view taken along line 2—2 of the rotor of the synchronous electric machine of FIG. 1 employing an alternative embodiment in accordance with the present invention.

The rotor shaft 32 includes a plurality of poles 40 fixedly secured thereto and circumferentially spaced about the rotor shaft 32. Between each of the poles 40 is provided an interpole space 42 for accommodating rotor field windings 44 in a conventional manner as best illustrated in FIGS. 2A and 2B. While FIGS. 2A and 2B illustrate the rotor field windings 44 as round wires wrapped about the poles 40, these windings may alternatively be in the form of straps, or the like, wound about the poles as well.

In order to maintain the rotor field windings 44 stationary with respect to the poles 40 during the rotation of the rotor shaft 32, wedges 46 and 48 are provided within the interpole space 42. The positioning of the wedges 46 and 48 being best illustrated in FIGS. 2A and 2B. In addition to the wedges 46 and 48, a wedge retainer 50 is also provided within the interpole space 42 and secured in place by way of expanded portions 52 of the poles 40.

Referring further to FIGS. 2A and 2B, the wedge 46 is provided with heat pipes 54 and 56, and the wedge 48 is provided with heat pipes 58 and 60, respectively. While FIGS. 2A and 2B illustrate the wedges 46 and 48 as accommodating two heat pipes in each, the number of heat pipes will vary depending upon the size and application of the particular synchronous electric machine. As can be seen from FIGS. 2A and 2B, the cross-sectional configuration of each of the heat pipes is in the form of a trapezoid having a major surface 62 spaced radially outward from a minor surface 64 in order to take advantage of the enlarged surface so as to optimize the heat transfer between the wedge which is formed of a non-magnetic highly conductive material such as aluminum, berillyium or copper and a volatile fluid such as water, freon or liquid cryogens. This feature will be explained in greater detail hereinbelow.

As can be seen from FIG. 2B, the wedge retainer 50 is also provided with a pair of heat pipes 66 having an oval or eliptical cross-section with the major axis being substantially perpendicular to a radial plane which bisects the wedge retainer 50. By providing heat pipes having a substantially oval or eliptical cross-section, a greater surface contact is achieved between the volatile fluid and the wedge retainer 50 resulting in an optimum amount of heat being transferred from the wedge retainer 50 to the volatile fluid.

Figure 3A:
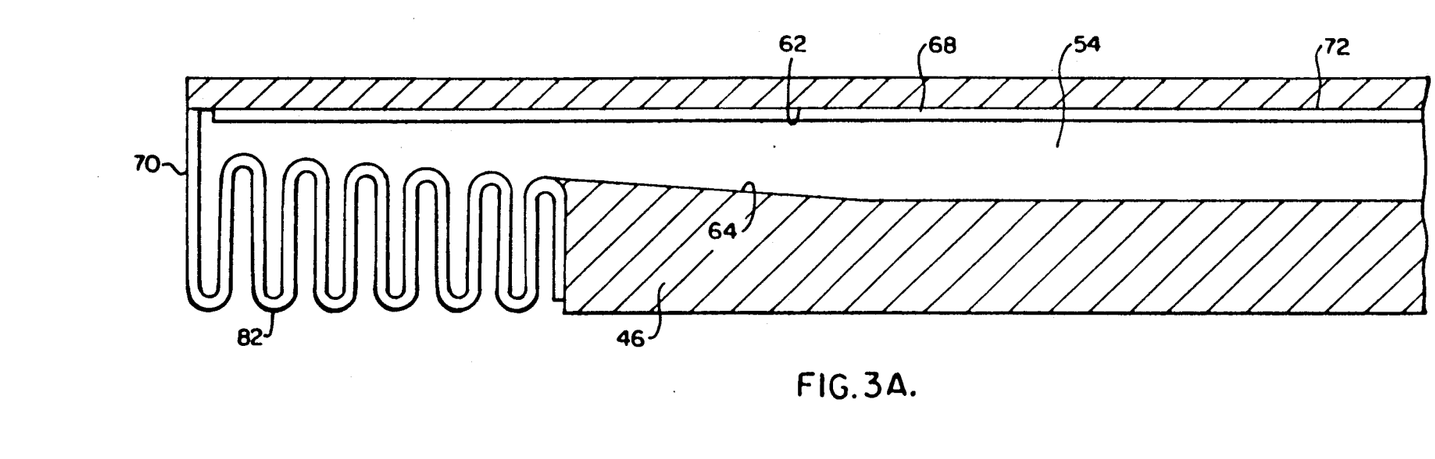
FIG. 3A is a cross-sectional view of a heat pipe formed within a wedge in accordance with the present invention.
Figure 3B:
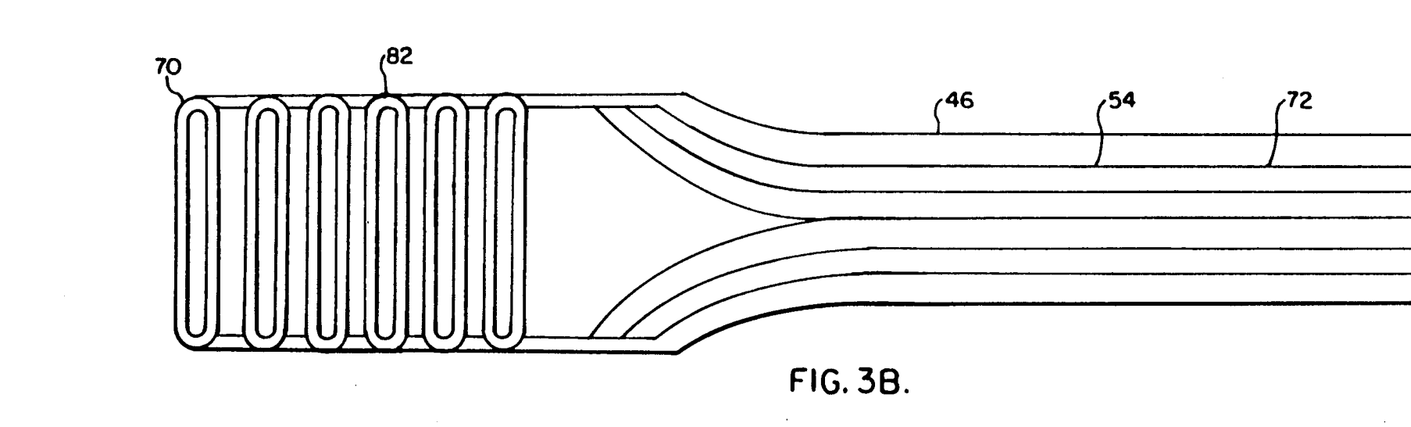
FIG. 3B is a bottom view of the wedge illustrated in FIG. 3A.

Referring now to FIGS. 3A and 3B, the wedge 46 is illustrated and includes a heat pipe 54. Along the axial length of the heat pipe 54 is provided a porous material 68 which aids in the movement of the volatile liquid between the condenser section 70 and the evaporator section 72 of the heat pipe 54. As can be seen from FIG. 1, the condenser section 70 of the heat pipe 54 extends beyond the rotor field windings 44 into a heat transfer medium area 74 within the housing 12. In this heat transfer medium area 74, the axially extending ends of the heat pipes 54 are sprayed with droplets of a nonvolatile liquid such as oil or a volatile liquid such as water, freon or liquid cryogen by way of the spray nozzles 76 secured to the rotor shaft 32. While the nozzles 76 are illustrated as being fixed to and rotatable with the rotor shaft 32, stationary nozzles may be positioned within the housing 12 in order to spray the coolant medium onto the condenser section 70 of the heat pipes. The coolant medium is supplied to the nozzle 76 from an inner portion 78 of the rotor shaft by way of passages 80.

As can be seen from FIGS. 3A and 3B, the condenser section 70 of the heat pipe 54 includes a plurality of fins 82 which aid in the transfer of heat from the volatile fluid to the coolant medium sprayed thereon. Further, as can be seen from FIG. 3B, the condenser section 70 of the heat pipe is expanded in this region in order to further optimize the heat transfer between the volatile fluid within the heat pipe and the coolant medium sprayed thereon.

During the operation of synchronous electric machines, ohmic heating is generated within the field windings due to the flow of dc excitation current and the flow of eddy currents produced by armature currents in relative motion on the outer surface of the rotor. As described above, the useful operating capability of such machines is limited by the ability of the rotor cooling system to remove heat while maintaining rotor components at levels acceptable for insulation life and mechanical stability of the rotor. In accordance with the present invention, heat is transported along the length of a heat pipe with a very small temperature gradient. Rotor component temperature rises are controlled essentially by the temperature gradient required to carry heat to the heat pipe, the temperature gradient required to transfer heat from the heat pipe to the cooling medium at the condenser section 70 of the heat pipe and the temperature and heat capacity of the cooling medium. The heat pipe configurations set forth above in accordance with the present invention minimizes these temperature gradients while maintaining rugged design characteristics compatible with use on high speed rotors.

As stated previously, the wedge is made from nonmagnetic highly conductive material such as aluminum, berillyium or copper which serves a dual purpose of restraining coil motion perpendicular to the pole center line and collecting heat generated along the length of the rotor field windings by conduction. Again, one or more interpole wedges having one or more axially extending heat pipes therein dependent upon the size and application of the particular synchronous electric machine are provided within each wedge.

The condenser section 70 of the heat pipes which extend beyond the axial length of the poles is designed for the efficient transfer of heat to a cooling medium which is sprayed thereon by either stationary spray nozzles positioned within the housing 12 or spray nozzles secured to the rotor shaft 32 which are rotatable therewith. Also included are an array of fins 82 provided on the condenser section of the heat pipe to provide an extended surface for the transfer of heat to the coolant medium. The heat pipe extensions are supported radially against centrifugal force by a retaining ring 84 which is specifically designed to prevent non-uniform or unpredictable retention of the coolant medium which might interfere with the mechanical balance of the rotor. Thus, the retaining ring must allow the coolant medium to pass freely thereabout.

Alternatively, the cooling medium may be a gaseous cooling medium such as air which would allow the use of fins of a lighter construction at the condenser section 70. When using a gaseous cooling medium, the heat pipe extensions and cooling fins would thus act as a centrifical blower which promotes the flow of the gaseous cooling medium through its intended flow path within the housing 12.

During the operation of the synchronous electric machine, the volatile working fluid experiences a liquid-to-vapor phase transition at temperatures and pressures consistent with particular machine requirements. As discussed above, the shape of the heat pipe internals is uniquely adapted to the wedges positioned within the interpole spaces of synchronous electric machines. The heat pipes within the wedges are of a trapezoidal cross-section, having the major surface or outermost wall substantially forming the axial element of a cylinder. During rotation of the rotor of the synchronous machine, the liquid phase of the volatile fluid is forced under the action of centrifugal force against the outer wall while the remaining heat pipe space is occupied by essentially saturated vapor in equilibrium with the liquid phase. It should be noted that only a thin film of liquid exists within the heat pipe during rotation thereof. Heat transport is accomplished within the heat pipe by a closed evaporation and condensation cycle. Heat is conducted through the walls of the evaporator section 72 in contact with the rotor field windings 44 and is transferred to the liquid phase of the volatile fluid. The addition of such heat causes boiling of the volatile fluid which generates a vapor which flows at a high speed to the condenser section 70 of the heat pipe which is cooled by an external cooling medium such as non-volatile or volatile liquid sprayed from either stationary or rotary nozzles or by the flow of air or other gases through the housing of the synchronous electric machine. In the condenser section, the vapors condense, releasing the heat of vaporization to the external cooling medium. The condensed liquid phase of the volatile fluid then returns to the evaporator section of the heat pipe to replace that volatile fluid which is evaporated in this area, thus, maintaining a constant liquid fraction and gas pressure at any steady state operating condition in the evaporator section. Again, the motive force for return of the fluid is centrifugal force.

The configuration of the heat pipe set forth in accordance with the present invention provides greater utilization of the available cross-sectional area of the heat pipes than with that of conventional heat pipes. Boiling heat transfer in the evaporator section 72 of the heat pipe is dependent on surface contact with the volatile fluid and is not assisted by any added depth to the liquid. Hence, a thin film of liquid on the enlarged surface of the outer wall provides an optimal boiling surface without detracting greatly from the vapor flow space. The boiling surface may be further increased by providing shallow ribs or flutes along the flow direction thereby providing a greater surface area for heat transfer from the wedge to the volatile fluid. Such flutes can be used to support a porous material such as a screen to substantially separate the liquid and vapor phases, and minimize liquid entrainment by the vapor flow. The functions of flutes and screens can be provided by a porous media similar to a wicking media used in stationary heat pipes. Additionally, at the condenser section 70 of the heat pipe, condensation can be enhanced by minimizing the liquid film thickness that accumulates on the surface. Accordingly, the best condensing surfaces are those where the cooling medium is immediately centrifuged away once heat has been transferred thereto. Additionally, heat transfer may be enhanced by providing on the innermost wall and side walls of the heat pipe at the condenser section 70 radially protruding axially extending ribs which extend from the innermost wall towards the outermost wall which includes the volatile fluid in a liquid phase. Also the heat transfer may be enhanced by an array of pin fins projecting from the innermost wall radially outward; however, these fins must not restrict the flow of vapor through the length of the condenser section. A similar addition of a radially oriented condensing surface can be provided by the drilling of radial holes into fins which protrude radially inward from the condenser section. Further, in order to enhance the flow of the liquid and vapor within the heat pipe, the heat pipe may be inclined slightly thereby aiding in the natural movement of the fluid generated by centrifugal forces acting on the fluid.

By providing the heat pipe within the wedges provided in the interpolar spaces provides a high capacity for transporting heat along its length. In accordance with the present invention, all exterior surfaces of the wedge can be utilized to carry heat from the rotor field windings and from the pole heads or other structural wedges which may be in thermal contact with the wedge including the heat pipes. Additionally, copper fins may be interleaved through the rotor field windings to improve heat conduction from the rotor field windings to the wedge accommodating the heat pipes. It is desirable that the condenser ends extend beyond the electromagnetically active length of the rotor body however, this adds to the overall length of the synchronous electrical machine. This extension beyond the electromagnetically active length of the rotor body may be minimized because the surface heat transfer coefficients at the condenser section are generally higher than those in the evaporator section and the perimeter of the heat pipe in contact with the vapor is greater than that in contact with the fluid; thus, the condenser length may be made significantly shorter than that of the evaporator length. Accordingly, the additional length added to the housing of the synchronous electrical machine can be minimized.

As can be seen from the foregoing, a major limitation to the design of compact high-power density synchronous electric machines is the ability to efficiently remove heat from the rotor field windings and rotor surface to maintain suitably low component temperatures. In accordance with the present invention, heat pipes having predetermined configurations are provided within the wedges and wedge retainers for maintaining the rotor field windings in position for efficiently collecting heat generated along the length of the rotor field windings and rotor surface and transporting this heat to the ends of the rotor where it is transferred to a coolant medium such as a gas or spray liquid. Moreover, the particular heat pipe positioning and configuration provides an optimal amount of heat transfer surface area for transferring heat from the wedge material to the volatile fluid flowing within the heat pipe. Heat is thus efficiently transferred to the volatile fluid which changes the volatile fluid from a liquid phase to a vapor phase where the vapor flows at a high speed to a condenser section beyond the axial length of the rotor field windings where heat is dissipated from the volatile fluid to the cooling medium.

While the present invention has been described with reference to a preferred embodiment, it will be appreciated by those skilled in the art that the invention may be practiced otherwise than as specifically described herein without departing from the spirit and scope of the invention. It is, therefore, to be understood that the spirit and scope of the invention be limited only by the appended claims.

We claim:

1. An assembly for cooling salient pole machines including a stator circumferentially surrounding a rotor including a plurality of poles having interpole spaces between each of the poles for accommodating pole windings therein, said assembly comprising:
    a wedge means positioned within each of the interpole spaces and having a length extending in a substantially axial direction therein for securing the position of the respective windings; and
    at least one closed end coolant conducting means formed in said wedge means to define an elongated bore of polygonal cross-section extending substantially the length of said wedge means for conducting coolant within said wedge means, at least one surface of said elongated bore extending substantially perpendicular to a plane which longitudinally bisects said wedge means;
    wherein said coolant conducting means conducts heat away from the poles.

2. The assembly as defined in claim 1, wherein said elongated bore is of a trapezoidal cross-section having a major surface and a minor surface extending substantially perpendicular to the plane longitudinally bisecting said wedge means, said major surface being spaced radially outward from said minor surface with respect to a central axis of the rotor.

3. The assembly as defined in claim 2, wherein at least a portion of said wedge means including said coolant conducting means extends axially beyond the poles of the rotor and into a heat transfer media.

4. The assembly as defined in claim 3, wherein said heat transfer media contacts said portion of said wedge extending beyond the rotor such that heat is transferred from said coolant conducting means to said heat transfer media.

5. The assembly as defined in claim 4, wherein said wedge means includes at least two wedges, said wedges being provided in each of said interpole spaces and radially spaced from one another.

6. The assembly as defined in claim 5, wherein each of said wedges includes a first and second coolant conducting means.

7. The assembly as defined in claim 5, wherein said second coolant conducting means is radially spaced outwardly from said first heat conducting means.

8. The assembly as defined in claim 7, further comprising a wedge retaining means positioned in the interpole space for retaining said wedge means in place, said wedge retaining means including at least one coolant conducting means extending substantially longitudinally therethrough for conducting coolant through said wedge retaining means for conducting heat away from the poles.

9. The assembly as defined in claim 8, further comprising a layer of porous material within said elongated bore and adjacent at least said one surface of said elongated bore.

10. A device for positioning and cooling windings of a rotor having salient poles and interpole spaces therebetween, said device comprising:
- a wedge means positioned within each of the interpole spaces for securing the position of the respective windings;
- a first closed end coolant conducting means formed in said wedge means for conducting coolant within said wedge means;
- a wedge retaining means positioned in the interpole space for retaining said wedge means in place, and
- a second closed end coolant conducting means in said wedge retaining means for conducting coolant through said wedge retaining means;
- wherein said first and second coolant conducting means conduct heat away from the poles.

11. The device as defined in claim 10, wherein said wedge means and said wedge retaining means extend in a substantially axial direction within the interpole spaces.

12. The device as defined in claim 10, wherein said and second coolant conducting means are elongated bores extending substantially the length of said wedge means and said wedge retaining means respectively.

13. The device as defined in claim 12, wherein said first coolant conducting means is of a polygonal cross-section and said second coolant conducting means is of a substantially oval cross-section.

14. The device as defined in claim 13, wherein at least one surface of said first coolant conducting means extends substantially perpendicular to a plane which longitudinally bisects said wedge means.

15. The device as defined in claim 12, wherein said first coolant conducting means is of a trapezoidal cross-section having a major surface and a minor surface extending substantially perpendicular to a plane longitudinally bisecting said wedge means, said major surface being spaced radially outward from said minor surface with respect to a central axis of the rotor.

16. The device as defined in claim 10, wherein at least a portion of said wedge means including said first coolant conducting means and a portion of said wedge retaining means including said second coolant conducting means extend axially beyond the poles of the rotor, and into a heat transfer media.

17. The device as defined in claim 16, wherein said heat transfer media contacts said portion of said wedge means and said portion of said wedge retaining means which extends beyond the rotor such that heat is transferred from said first and second coolant conducting means to said heat transfer media.

18. The device as defined in claim 19, wherein said wedge means includes at least two wedges, said wedges being positioned in each of said interpole spaces and radially spaced from one another.

19. The device as defined in claim 13, wherein a major axis of said oval coolant conducting means extends substantially perpendicular to a plane longitudinally bisecting said wedge retaining means.

20. A method for cooling salient pole machines including a stator circumferentially surrounding a rotor including a plurality of poles having interpole spaces therebetween for accommodating pole windings therein, said method comprising the steps of:
- positioning a wedge means within each of the interpole spaces for securing the position of the respective windings;
- providing a first and a second closed end coolant conducting means in said wedge means each defined by an elongated bore of polygonal cross-section extending substantially the length thereof and operable to conduct coolant within said wedge means;
- positioning a wedge retaining means in the interpole space for retaining said wedge means in place, and
- conducting coolant through said first and second coolant conducting means during the operation of the salient pole machine to transfer heat away from the poles.

21. The method as defined in claim 20, wherein at least one surface of the elongated bore of each said first and second coolant conducting means extends substantially perpendicular to a plane which longitudinally bisects said wedge means.

22. The method as defined in claim 21, wherein the elongated bore of each of said first and second coolant conducting means is of a trapezoidal cross-section having a major surface and a minor surface extending substantially perpendicular to the plane longitudinally bisecting said wedge means, said major surface being spaced radially outward from said minor surface with respect to a central axis of the rotor.

23. The method as defined in claim 22, wherein at least a portion of said wedge means including said first and said second coolant conducting means extends axially beyond the poles of the rotor and into a heat transfer media.

24. The method as defined in claim 23, wherein said heat transfer media contacts said portion of said wedge means which extends beyond the rotor such that heat is transferred from said first and said second coolant conducting means to said heat transfer media.

25. The method as defined in claim 24, wherein said wedge means includes at least two wedges, said wedges being provided in each of said interpole spaced and radially spaced from one another.

26. An assembly for cooling salient pole machines including a stator circumferentially surrounding a rotor including a plurality of poles having interpole spaces between each of the poles for accommodating pole windings therein, said assembly comprising:
- a wedge means positioned within each of the interpole spaces for securing the position of the respective windings, said wedge means extending in a substantially axial direction within the interpole spaces;
- a first closed end coolant conducting means formed in said wedge means for conducting coolant within said wedge means;
- a wedge retaining means positioned in the interpole space for retaining said wedge means in place, said wedge retaining means extending in a substantially axial direction within the interpole spaces; and
- a second closed end coolant conducting means in said wedge retaining means for conducting coolant through said wedge retaining means, said first coolant conducting means being elongated bores having a trapezoidal cross-section and said second coolant conducting means being of a substantially oval cross-section with respective coolant conducting means extending substantially the length of said wedge means and said wedge retaining means respectively;

wherein said first and second coolant conducting means conduct heat away from the poles.

27. The assembly as defined in claim 6, wherein least one surface of said first coolant conducting means extends substantially perpendicular to a plane which longitudinally bisects said wedge means.

28. The assembly as defined in claim 27, wherein said first coolant conducting means includes major surface and a minor surface extending substantially perpendicular to a plane longitudinally bisecting said wedge means, said major surface being spaced radially outward from said minor surface with respect to a central axis of the rotor.

29. The assembly as defined in claim 28, wherein at least a portion of said wedge means including said first coolant conducting means and a portion of said wedge retaining means including said second coolant conducting means extend axially beyond the poles of the rotor and into a heat transfer media.

30. The assembly as defined in claim 29, wherein said heat transfer media contacts said portion of said wedge means and said portion of said wedge retaining means which extends beyond the rotor such that heat is transferred from said first and second coolant conducting means to said heat transfer media.

31. The assembly as defined in claim 30, wherein a major axis of said oval coolant conducting means extends substantially perpendicular to a plane longitudinally bisecting said wedge retaining means.

* * * * *